United States Patent
Roskind

(10) Patent No.: US 8,239,532 B1
(45) Date of Patent: Aug. 7, 2012

(54) SYSTEM AND METHOD OF REDUCING LATENCY USING ADAPTIVE DNS RESOLUTION

(75) Inventor: James Roskind, Redwood City, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 12/822,665

(22) Filed: Jun. 24, 2010

(51) Int. Cl.
*G06F 15/173* (2006.01)

(52) U.S. Cl. ........ 709/225; 709/241; 709/243; 709/245; 709/250; 709/216; 709/232; 709/217; 726/4; 726/5; 726/24; 370/401; 370/352; 370/235; 370/466

(58) Field of Classification Search .................. 709/203, 709/225–229, 250, 219
See application file for complete search history.

(56) References Cited

U.S. PATENT DOCUMENTS

| | | |
|---|---|---|
| 5,961,605 A | 10/1999 | Deng et al. |
| 6,205,120 B1 | 3/2001 | Packer et al. |
| 6,215,769 B1 | 4/2001 | Ghani et al. |
| 6,219,713 B1 | 4/2001 | Ruutu et al. |
| 6,252,851 B1 | 6/2001 | Siu et al. |
| 6,341,129 B1 | 1/2002 | Schroeder et al. |
| 6,446,121 B1 | 9/2002 | Shah et al. |
| 6,646,987 B1 | 11/2003 | Qaddoura |
| 6,788,704 B1 | 9/2004 | Lindsay |
| 6,925,060 B2 | 8/2005 | Mangin |
| 6,958,997 B1 | 10/2005 | Bolton |
| 7,142,536 B1 | 11/2006 | Gossett et al. |
| 7,174,386 B2 | 2/2007 | Cunningham et al. |
| 7,225,266 B2 | 5/2007 | Ameigeiras et al. |
| 2002/0040400 A1* | 4/2002 | Masters ........................ 709/228 |
| 2002/0112057 A1 | 8/2002 | Srinivas et al. |
| 2004/0128346 A1 | 7/2004 | Melamed et al. |
| 2005/0210130 A1* | 9/2005 | Tanaka ........................ 709/224 |
| 2008/0075000 A1 | 3/2008 | Robbins |
| 2008/0089230 A1 | 4/2008 | Kootstra |
| 2008/0266383 A1* | 10/2008 | Shah et al. ................. 348/14.09 |
| 2009/0204711 A1* | 8/2009 | Binyamin ..................... 709/226 |

OTHER PUBLICATIONS

Akamai's EdgePlatform for Application Acceleration, Akamai Technologies, Inc., (2007).
Akamai Solution Dynamic Site Accelerator, Akamai Technologies, Inc. (2008).
Akamai Edge Computing, Akamai White Paper, Akamai Technologies, Inc. (2003).
Akamai Solution Akamai Electronic Software Delivery, Akamai Technologies, Inc. (2010).
Akamai Solution IP Application Accelerator, Alkamai Technologies, Inc. (2009).

(Continued)

*Primary Examiner* — Jude Jean Gilles
(74) *Attorney, Agent, or Firm* — Lerner, David, Littenberg, Krumholz & Mentlik, LLP

(57) ABSTRACT

A system and method is provided whereby a client device adaptively optimizes the selection of a network device from a plurality of network devices hosting information desired by the client device. Each of the network devices hosting information desired by the client device is associated with a common host name and a different IP address, and the client selects an optimal network device based on a rank assigned to the one or more network devices. A rank assigned to the optimal network device indicates the greatest desirability, from the client device's perspective, of the optimal network device relative to the other network devices. Furthermore, the ranks assigned to the one or more network devices are adaptively determined based upon a determination of an estimated latency, determined from the client device's perspective, between the client device and the one or more network devices.

20 Claims, 15 Drawing Sheets

OTHER PUBLICATIONS

Akamai Information Security Management System Overview, Akamai Technologies, Inc. (2009).

Akamai Solution Akamai Media Delivery, Akamai Technologies, Inc. (2008).

Akamai Site Analyzer Service Description, Akamai Technolgies, Inc. (2009).

Akamai Solution Web Application Accelerator, Akamai Technologies, Inc. (2009).

Akamai Web Application Accelerator, Akamai Technologies, Inc. (2005).

Akamai's Application Acceleration Services: Transform the Internet into a Business-Ready Application Delivery Platform, Akamai Technologies, Inc. (2009).

Beyond Caching: The User Experience Impact of Accelerating Dynamic Site Elements across the Internet, Akamai Technolgies, Inc. (2008).

Akamai EdgeSuite NetStorage, Akamai Technologies, Inc. (2006).

Feldmann et al., "Locating Internet Routing Instabilities", SIGCOMM'04 (2004).

Akamai Professional Services—Enterprise Services Where Business Meets Technology, Akamai Technologies, Inc. (2006).

Akamai Professional Services—Standart and Enterprise Services, Akamai Technologies, Inc. (2006).

* cited by examiner

| Network Device | DNS Name | IP Address | Location | Rank |
|---|---|---|---|---|
| 1 | www.a.com | 1.1.2.3 | New York | 62 |
| 2 | www.a.com | 1.3.4.6 | Chicago | 45 |
| 3 | www.b.com | 1.5.6.1 | Philadelphia | 71 |
| 4 | www.c.com | 1.2.4.7 | Washington D.C. | 13 |
| 5 | www.c.com | 1.5.2.6 | Miami | 21 |
| 6 | www.a.com | 1.1.4.9 | Pittsburg | 68 |
| 7 | www.a.com | 1.2.1.2 | San Jose | 24 |
| 8 | www.b.com | 1.6.6.4 | Las Vegas | 59 |
| 9 | www.d.com | 1.5.7.4 | Chicago | 80 |
| 10 | www.f.com | 1.7.2.1 | Washington D.C. | 87 |
| 11 | www.x.com | 1.8.6.5 | St. Louis | 25 |
| 12 | www.a.com | 1.4.9.1 | Denver | 35 |
| 13 | www.c.com | 1.9.5.0 | New York | 15 |

FIGURE 3

| Network Device | PRIOR COMMUNICATIONS RESPONSE TIMES (Seconds) | |
|---|---|---|
| | Most Recent | 25 Previous |
| 1 | .46 | .51 |
| 2 | .82 | .75 |
| 3 | .39 | .63 |
| 4 | 1.98 | 2.10 |
| 5 | 1.46 | 1.41 |
| 6 | .55 | .59 |
| 7 | .88 | .42 |
| 8 | .67 | .54 |
| 9 | .28 | .38 |
| 10 | .22 | .18 |
| 11 | .88 | .83 |
| 12 | .94 | 1.2 |
| 13 | 1.85 | 1.75 |

FIGURE 5

| Network Device | DNS Name | IP Address | Location | Rank |
|---|---|---|---|---|
| 1 | www.a.com | 1.1.2.3 | New York | 62 |
| 2 | www.a.com | 1.3.4.6 | Chicago | 45 |
| 6 | www.a.com | 1.1.4.9 | Pittsburg | 68 |
| 7 | www.a.com | 1.2.1.2 | San Jose | 24 |
| 12 | www.a.com | 1.4.9.1 | Denver | 35 |

FIGURE 7

| Network Device | DNS Name | IP Address | Location | Rank |
|---|---|---|---|---|
| 1 | www.a.com | 1.1.2.3 | New York | 62 |
| 2 | www.a.com | 1.3.4.6 | Chicago | 45 |
| 6 | www.a.com | 1.1.4.9 | Pittsburg | (68) — 802 |
| 7 | www.a.com | 1.2.1.2 | San Jose | 24 |
| 12 | www.a.com | 1.4.9.1 | Denver | 35 |

| Network Device | DNS Name | IP Address | Location | Rank |
| --- | --- | --- | --- | --- |
| 1 | www.a.com | 1.1.2.3 | New York | 62 |
| 2 | www.a.com | 1.3.4.6 | Chicago | 45 |
| 3 | www.b.com | 1.5.6.1 | Philadelphia | 71 |
| 4 | www.c.com | 1.2.4.7 | Washington D.C. | 13 |
| 5 | www.c.com | 1.5.2.6 | Miami | 21 |
| 6 | www.a.com | 1.1.4.9 | Pittsburg | 68 (41) |
| 7 | www.a.com | 1.2.1.2 | San Jose | 24 |
| 8 | www.b.com | 1.6.6.4 | Las Vegas | 59 |
| 9 | www.d.com | 1.5.7.4 | Chicago | 80 |
| 10 | www.f.com | 1.7.2.1 | Washington D.C. | 87 |
| 11 | www.x.com | 1.8.6.5 | St. Louis | 25 |
| 12 | www.a.com | 1.4.9.1 | Denver | 35 |
| 13 | www.c.com | 1.9.5.0 | New York | 15 |

FIGURE 9

| Network Device | DNS Name | IP Address | Location | Rank |
|---|---|---|---|---|
| 1 | www.a.com | 1.1.2.3 | New York | 62 |
| 2 | www.a.com | 1.3.4.6 | Chicago | 45 |
| 3 | www.b.com | 1.5.6.1 | Philadelphia | 71 |
| 4 | www.c.com | 1.2.4.7 | Washington D.C. | 13 |
| 5 | www.c.com | 1.5.2.6 | Miami | 21 |
| 6 | www.a.com | 1.1.4.9 | Pittsburg | 68 |
| 7 | www.a.com | 1.2.1.2 | San Jose | 24 |
| 8 | www.b.com | 1.6.6.4 | Las Vegas | 59 |
| 9 | www.d.com | 1.5.7.4 | Chicago | 80 |
| 10 | www.f.com | 1.7.2.1 | Washington D.C. | 87 |
| 11 | www.x.com | 1.8.6.5 | St. Louis | 25 |
| 12 | www.a.com | 1.4.9.1 | Denver | 35 |
| 13 | www.c.com | 1.9.5.0 | New York | 15 |
| 14 (NEW) | www.c.com | 1.4.8.5 | Boston | 25 |

FIGURE 12

| Network Device | DNS Name | IP Address | Location | Rank |
|---|---|---|---|---|
| 4 | www.c.com | 1.2.4.7 | Washington D.C. | 13 |
| 5 | www.c.com | 1.5.2.6 | Miami | 21 |
| 13 | www.c.com | 1.9.5.0 | New York | 15 |
| 14 | www.c.com | 1.4.8.5 | Boston | (16) |

FIGURE 13

SYSTEM AND METHOD OF REDUCING LATENCY USING ADAPTIVE DNS RESOLUTION

BACKGROUND OF THE INVENTION

The Transmission Control Protocol/Internet Protocol (TCP/IP) is a well known and widely used suite of protocols for servicing data transmissions between two devices communicating information over a network such as the Internet. The TCP/IP suite of protocols provides for connection-oriented, reliable, and ordered delivery of a stream of information (i.e., payload data) between, for example, a web-browser application running on a client device and a web-server application running on a server device over a local or wide area network.

To facilitate communication using the TCP/IP protocol, network devices use an IP address (e.g., "207.99.20.142") to uniquely identify and communicate with another device on the network. Human users, on the other hand, often prefer to use DNS or host names such as "www.xyz.com", as it is much easier for humans to remember user-friendly host names than to work with long numerical IP addresses.

The user at a client device may thus enter a request for a desired resource (e.g., web-page) in the form of a Uniform Resource Locator (URL) into a web-browser application, where the URL identifies a network resource desired by the user and also contains the DNS or host name of a network device that is able to provide the desired resource. To service the user's request, the web-browser application may parse the URL to determine the host name (e.g., www.xyz.com) of the network device hosting the resource and to identify the desired resource (e.g., "home.html").

In order to obtain the desired resource over the network, the web-browser application typically needs to resolve the host name into IP addresses that uniquely identify network devices hosting the desired resource.

While a particular IP address is uniquely assigned to a single network device, a host name is often associated with multiple IP addresses. Thus, upon resolving the host name that is shared by multiple network devices, the web-browser application often has a choice of several network devices from which it may request the desired resource, where each of the several network devices shares the common host name and has a different IP address.

BRIEF SUMMARY OF THE INVENTION

In one aspect, a method for transmitting information over a network is provided. The method includes receiving, at a first network device in a network of devices, a request to obtain a desired resource from a device over the network; determining, by a processor at the first network device, a plurality of network devices associated with a common host name and a unique network address, where each network device in the plurality of network devices is adapted to provide the desired resource, and where at least one network device in the plurality of network devices is associated with a rank representing an estimated latency that is determined from one or more prior communications between the first network device and the at least one network device; selecting, at the first network device, an optimal network device from the plurality of network devices, where the optimal network device is selected based upon an optimal rank associated with the preferred network device, and where the optimal rank indicates the greatest relative desirability of the optimal network device relative to other network devices in said plurality of network devices; and, transmitting one or more data packets requesting the desired resource from the first network device to the optimal network device over the network, where the one or more data packets are transmitted based upon the unique network address associated with the optimal network device.

In another aspect, a system for transmitting information over a network is provided. The system includes a first network device having a memory storing instructions and data and a processor to execute the instructions and to process the data, where the data includes a first request for a desired resource to be provided over a network to a second device. And the instructions include determining, by the processor at the first network device, a plurality of network devices associated with a common host name and a unique network address, where each network device in the plurality of network devices is adapted to provide the desired resource, and where at least one network device in the plurality of network devices is associated with a rank based upon an estimated latency that is determined from one or more prior communications between the first network device and the at least one network device; selecting, at the first network device, an optimal network device from the plurality of network devices, where the optimal network device is selected based upon an optimal rank associated with the preferred network device, and where the optimal rank indicates the greatest relative desirability of the optimal network device relative to other network devices in the plurality of network devices; and, transmitting one or more data packets requesting the desired resource from the first network device to the optimal network device over the network, where the one or more data packets are transmitted based upon the unique network address associated with the optimal network device.

BRIEF DESCRIPTION OF THE DRAWINGS

FIG. 3 is a diagram of a network matrix in accordance with an aspect of the invention.

FIG. 5 is a diagram of a table containing latency metrics in accordance with an another aspect of the invention FIGS. 6-9 illustrate an exemplary operation in accordance with one aspect of the present invention.

FIGS. 10-13 illustrate an exemplary operation in accordance with another aspect of the present invention.

DETAILED DESCRIPTION

A system and method is provided whereby a client device adaptively optimizes the selection of a network device from a plurality of network devices hosting information desired by the client device. In one aspect, each of the network devices hosting information desired by the client device is associated with a common host name and a different IP address, and the client selects an optimal network device based on a rank assigned to the one or more network devices. A rank assigned to the optimal network device indicates the greatest desirability, from the client device's perspective, of the optimal network device relative to the other network devices. Furthermore, the ranks assigned to the one or more network devices hosting a resource desired by the client device may be adaptively determined based upon a determination of an estimated latency, determined from the client device's perspective, between the client device and the one or more network devices.

Figure 1:
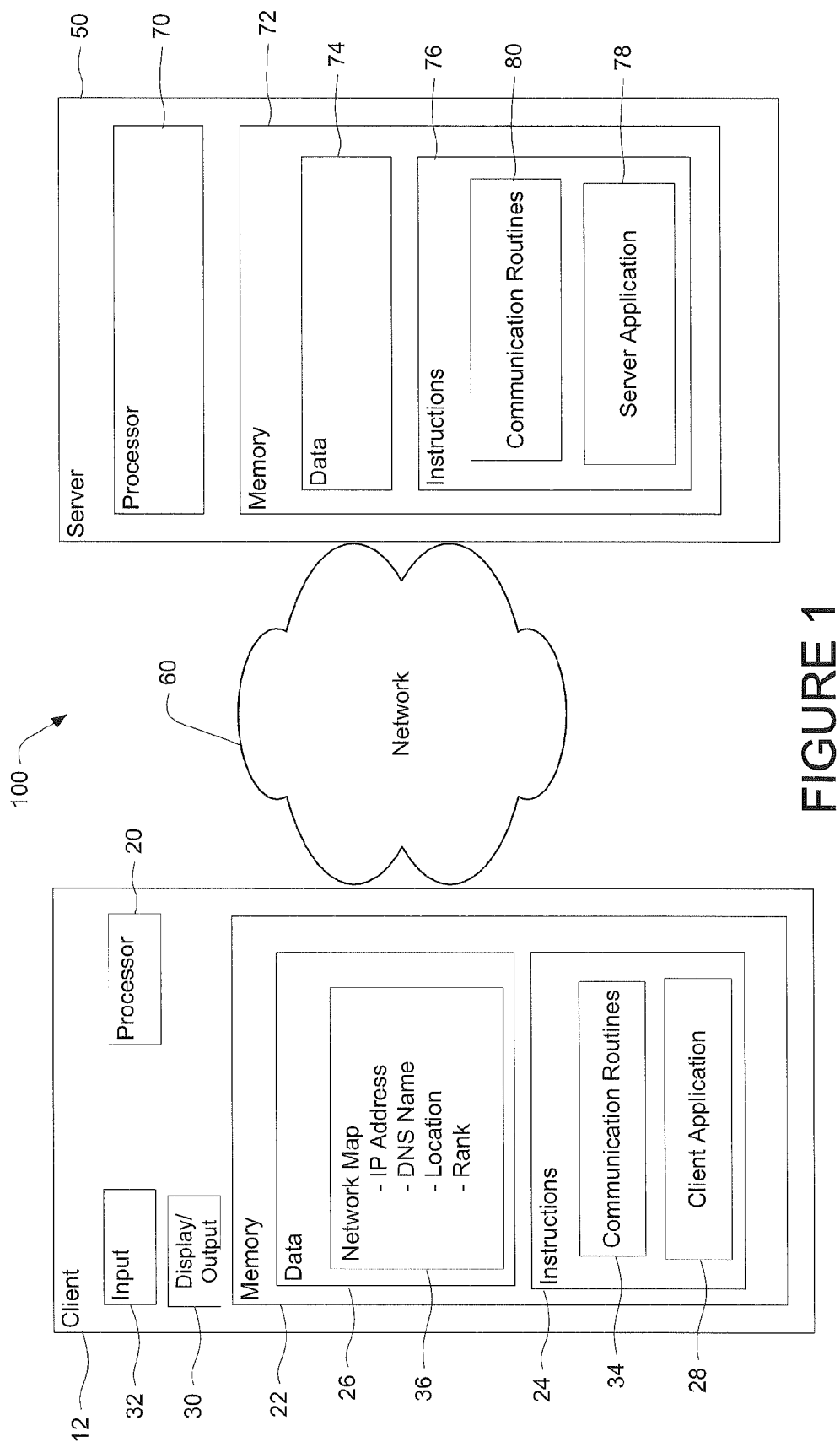
FIG. 1 is a block diagram of an exemplary embodiment of the system of FIG. 2.
Figure 2:
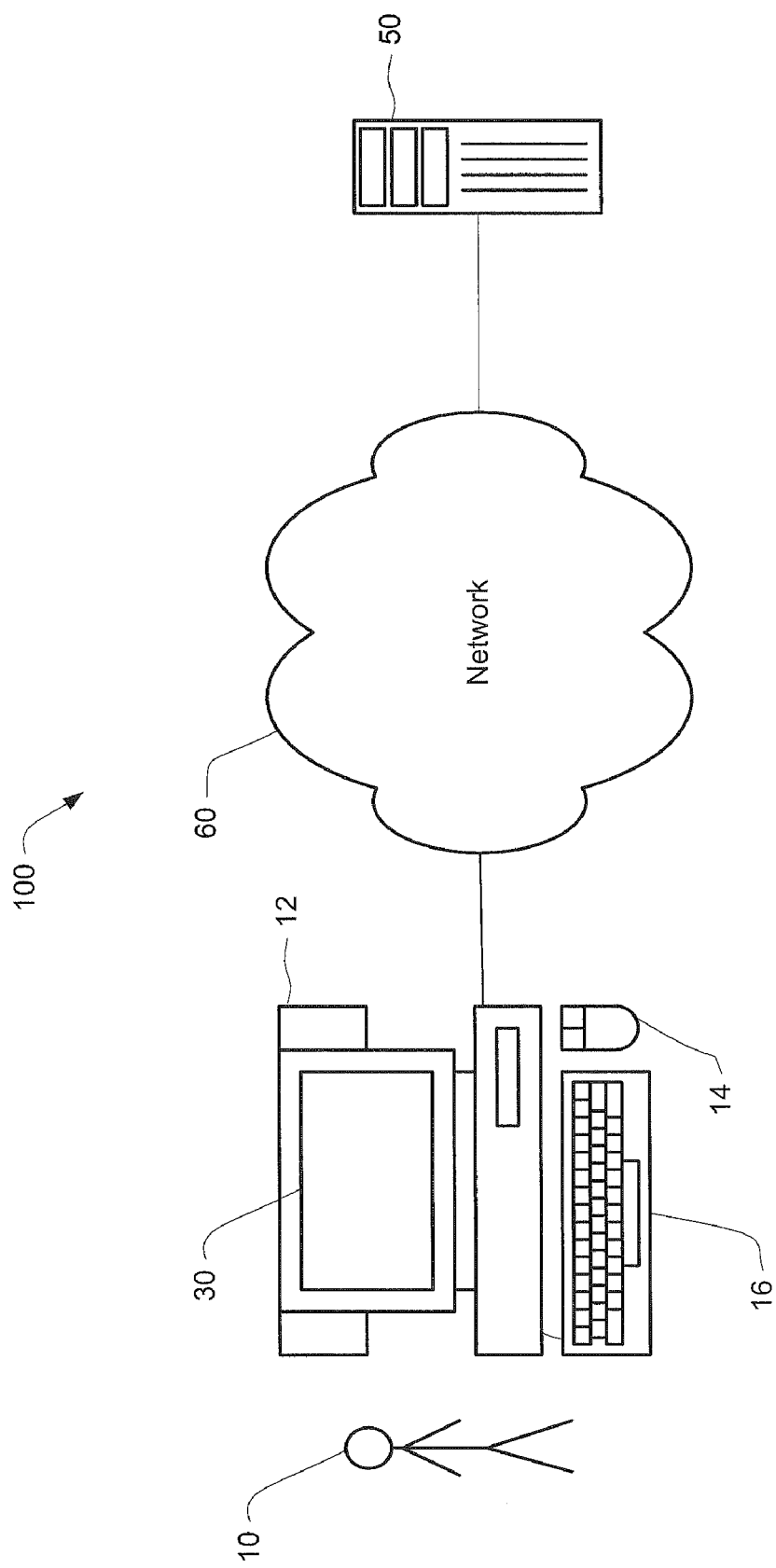
FIG. 2 is a diagram of a system in accordance with an aspect of the present invention.

Referring to FIGS. 1-2, a communication system 100 in accordance with one aspect of the invention may provide for exchange of data between a client computer 12 and a server computer 50 over a communication network 60. The client computer 12 contains a processor 20, memory 22 and other components typically present in general purpose computers. In addition, the server 50 contains a processor 70 and a memory 72.

The memory 22 in client computer 12 stores information accessible by the processor 20, including instructions 24 that may be executed by the processor 20 and data 26 that may be retrieved, manipulated or stored by the processor 20. Similarly, the memory 72 in server computer 50 stores information accessible by processor 70, including instructions 76 that may be executed by the processor 70 and data 74 that may be retrieved, manipulated or stored by the processor 70. The memory may be of any type capable of storing information accessible by the processor, such as a hard-drive, memory card, ROM, RAM, DVD, CD-ROM, write-capable, read-only memories.

The processors 20, 70 may comprise any number of well known processors, such as processors from Intel Corporation. Alternatively, the processors may be a dedicated controller such as an ASIC.

The instructions 24, 76 may comprise any set of instructions to be executed directly (such as machine code) or indirectly (such as scripts) by the processors 20, 70, respectively. In that regard, the terms "instructions," "steps" and "programs" may be used interchangeably herein. The instructions may be stored in object code form for direct processing by the processor, or in any other computer language including scripts or collections of independent source code modules that are interpreted on demand or compiled in advance. The functions, methods and routines of instructions in accordance with the present invention are explained in more detail below.

The data 26, 74 may be retrieved, stored or modified by the processors 20, 70 in accordance with the instructions 24, 76, respectively. The data may be stored as a collection of data. For instance, although the invention is not limited by any particular data structure, the data may be stored in computer registers, in a relational database as a table having a plurality of different fields and records, XML documents, or flat files. The data may also be formatted in any computer readable format such as, but not limited to, binary values, ASCII or EBCDIC (Extended Binary-Coded Decimal Interchange Code). Moreover, the data may comprise any information sufficient to identify the relevant information, such as descriptive text, proprietary codes, pointers, references to data stored in other memories (including other network locations) or information which is used by a function to calculate the relevant data.

Although the processor and memory are functionally illustrated in FIG. 1 within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

In one embodiment, the client computer 12 may be a general purpose computer, intended for use by a person, having all the internal components normally found in a personal computer such as a central processing unit (CPU), display 30, input 32 such as a CD-ROM drive, mouse, keyboard or microphone, and a hard-drive, speakers, modem and/or router (telephone, cable or otherwise) and all of the components used for connecting these elements to one another. Moreover, computers 50, 12 in accordance with the systems and methods described herein may comprise any device capable of processing instructions and transmitting data to and from humans and other computers, including network computers lacking local storage capability, PDAs with modems and Internet-capable wireless phones. Although the only input means shown in FIG. 2 are the mouse 14 and keyboard 16, other means for inputting information from a human into a computer are also acceptable such as a microphone, touch-sensitive screen, voice recognition, etc.

The server 50 and the client computer 12 are capable of direct and indirect communication, such as over the network 60. Although only a single client computer and a single server are depicted in FIGS. 1 and 2, it should be appreciated that a typical system can include a large number of connected computers and several servers to which the computers can connect, with each different computer being at a different node of the network. The network, and intervening nodes, may comprise various configurations and protocols including the Internet, intranets, virtual private networks, wide area networks, local networks, private networks using communication protocols proprietary to one or more companies, Ethernet, WiFi and HTTP. Such communication may be facilitated by any device capable of transmitting data to and from other computers, such as modems (e.g., dial-up or cable), networks cards and wireless interfaces.

In one aspect of the invention, instructions 76 in server 50 may include a server application 78 that receives and services requests for information that are received from other network devices over the network. The requests serviced by the server application 78 may be any type of request, such as a request for a connection to the server, a request to resolve a host name into one or more IP addresses associated with network devices, a ping request, or a request for one or more resources, such as a web-page, an image, or any other data, maintained by the server. The network devices may communicate information with the server device using one or more network protocols, such as the TCP/IP protocol suite or any other protocol that enables communications between various network devices over the network 60. In addition to receiving information over the network, the server application 78 may also transmit information, such as a response to a request, to other network devices over the network.

Instructions 76 may also include, as part of the server application 78 or as a separate application or routine, one or more communication routines 80 that assist in the receipt and transmission of the information from the server device to other network devices over the network. For example, the server application 78 may be a web-server application that relies upon communication routines 80 to transmit one or more data packets from the server device to the client device in accordance with one or more network protocols (e.g., TCP/IP), where each data packet may contain a portion of a desired resource (e.g., web-page) requested by a client application running on the client device. In this regard, the functions of sending, receiving and processing the data packets may also be accomplished using conventional communication routines provided by operating systems such as Linux and Microsoft Windows. In addition, while particularly advantageous when used in connection with web-servers, it will be understood that the system and method disclosed herein is not limited to any particular server application or type of server.

Data 74 in the server 50 may include any data, such as one or more requests that are received by the server device over the network, and may also include response data that the server device may transmit to one or more network devices in response to a request.

Likewise, instructions 24 in client 12 may include a client application 28. In one aspect, the client application may be a web-browser application such as the Internet Explorer from Microsoft or the Chrome web-browser from Google. The web-browser application 28 may accept input entered by a user into the web-browser application, such as a request for a desired resource that may be obtained from one or more network devices over the network. In one aspect, a user may enter a Uniform Resource Locator (URL) into the web-browser 28 that identifies a desired resource (e.g., a web-page), its location (e.g., host name of one or more network devices hosting the resource), and one or more protocols (e.g., Hypertext Transfer ("HTTP") protocol) that may be used to obtain the desired resource over the network. The desired resource may be a web-page, an image, a table, a program, or any other information that may be requested and obtained from one or more network devices over the network. The web-browser application 28 may process the information contained in the URL and request the desired resource from one or more network devices hosting the resource using one or more network protocols. The web-browser may also format and display, to the user, any data received from a network device in response to the web-browser's request, as part of one or more web-pages.

Instructions 24 may also include, as part of the web-browser application or as a separate application or routine, one or more communication routines 34 that assist in the receipt and transmission of information from the client device to other network devices over the network. In this regard, communication routines 34 on the client device 12 may provide similar functionality as that provided by the communication routines 80 on the server 50. For example, the web-browser application 28 may rely upon communication routines 34 for transmitting a request to the server 50 in accordance with one or more network protocols. In addition, web-browser 28 may also use the communication routines 34 for receiving any information from other network devices, such as the server 50, in accordance with one or more network protocols. In this regard, the functions of sending, receiving and processing information over the network may also be accomplished using communication routines that are provided by operating systems such as Linux and Microsoft Windows.

Data 26 in the client 12 may include any data that is transmitted or received by the client device over the network. For example, data 26 may include a request for information to be transmitted over the network to a network device, and may also include data that is received from a network device in response to a request from the client device.

Figure 14:
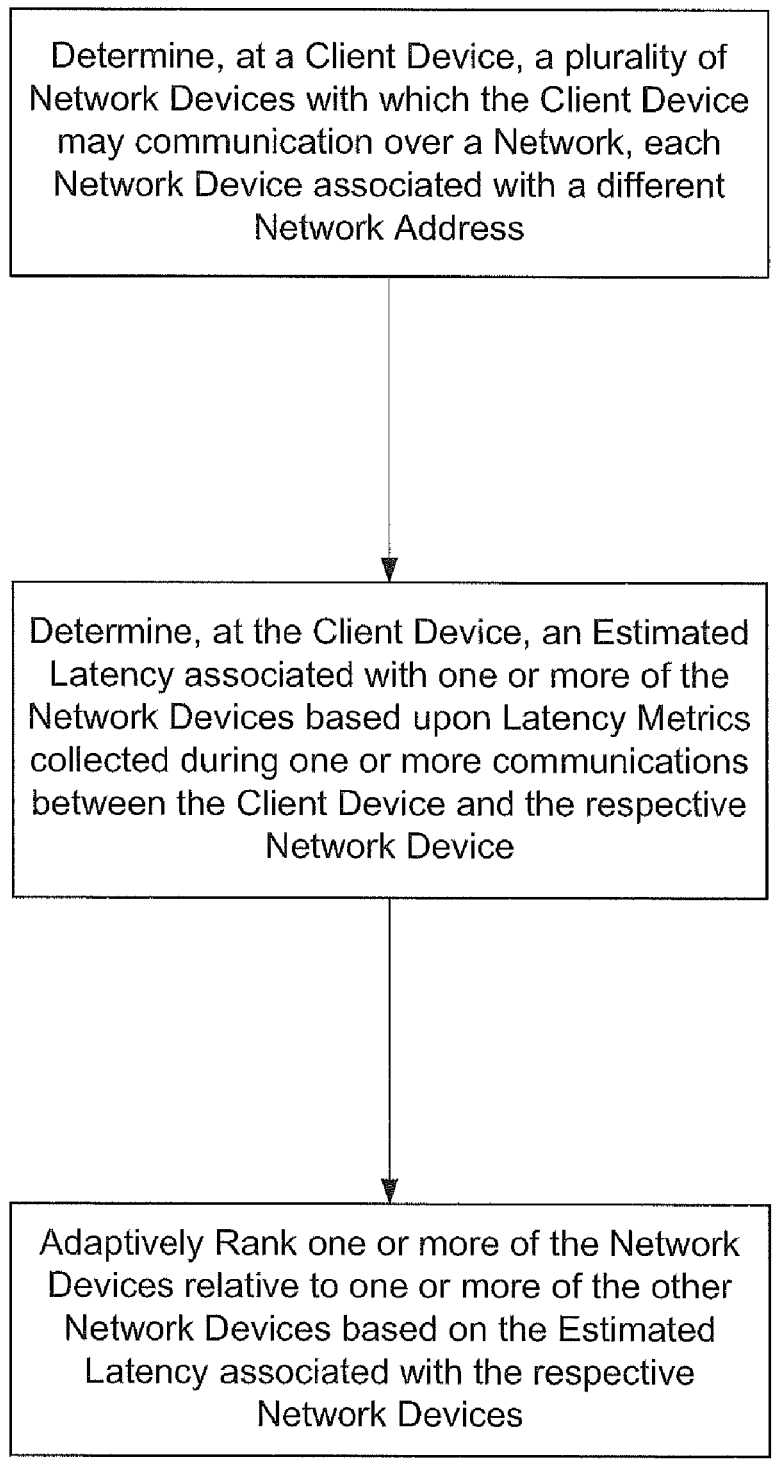
FIG. 14 illustrates a flow diagram of a process in accordance with various aspects of the present invention.

Various aspects of the invention in accordance with the process illustrated in FIG. 14 are now described below. In one aspect, data 26 in client 12 may include a network matrix 36, where matrix 36 includes information associated with one or more network devices with which the client may communicate over the network. As shown greater detail in FIG. 3, matrix 36 may include network device information 300 that represents the network devices with which the client 12 may communicate over the network. Matrix 36 may also include host name information 302, IP address information 304, and estimated geographical location information 306 that is associated with each of the network devices 300 contained in the matrix.

In one aspect, matrix 36 may also include rank information 308. The rank information 308 may indicate the relative desirability, from the client device's perspective, of any one network device relative to each or any of the other network devices 300 in the matrix. In accordance with this aspect, the client device may adaptively assign a higher numbered rank to a network device to indicate that network device's greater desirability relative to other network devices that are assigned a lower numbered rank. Thus, it can be seen in FIG. 3 that network device 10 is the most desirable network device by virtue of having been assigned the highest rank of 87 relative to the ranks assigned to all of the other network devices contained in the matrix, and that network device 4 is the least desirable network device by virtue of having been assigned the lowest rank of 13 relative to all of the other ranked network devices in the matrix. Furthermore, it can also be seen in FIG. 3 that network device 3, having a rank of 71, is relatively more desirable than network device 6 that has a lower rank of 68, but is less desirable than network device 9 that has a higher rank of 80.

In one aspect, the rank assigned to a network device in matrix 36 may be based upon a client device's determination of an estimated latency between the client device and the network device. In accordance with this aspect, an application running on the client device such as the web-browser application 28 may adaptively assign a higher numbered rank to a first network device and a lower numbered rank to a second network device, based upon a determination that the estimated latency between the client device and the first network device is lower than the estimated latency between the client device and the second network device. As described in further detail below, each of the network devices 300 may thus be ranked relative to one or more of the other network devices in matrix 36 based upon a determination of the estimated latency between the client device and the respective network devices.

In one aspect, the estimated latency between the client device and a network device in matrix 36 may be determined based upon latency metrics collected during prior communications between the client device and the network device.

In accordance with this aspect, an application running on the client device such as the web-browser application 28 may collect latency metrics associated with one or more recent prior communications between the client device and a respective network device in matrix 36. As shown by table 400 in FIG. 4 for example, the web-browser application may collect latency metrics 402 regarding a recent prior communication between the client device and each of the network devices 300 in matrix 36. In this regard, the prior communication between the client device and network devices 300 may include the most recent request for a desired resource transmitted by the client device to one or more network devices 300 over the network. Furthermore, the latency metrics 402 collected during prior communications may indicate a measure of the total response time, where the total response time indicates the amount of time that elapses between the time that a prior request was transmitted to a respective network device and the time that information responsive to the request was received at the client device.

Figure 4:
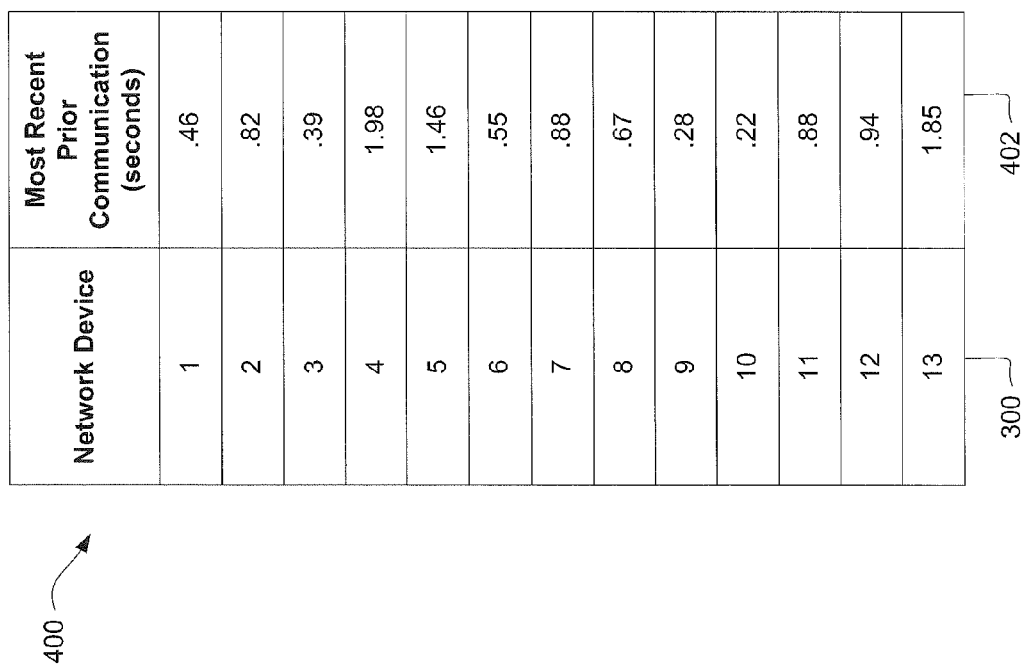
FIG. 4 is a diagram of a table containing latency metrics in accordance with an aspect of the invention.

By way of a specific example, it can be seen FIG. 4 that the total response time during the most recent prior communication between the client device and network device 10 was 0.22 seconds. In contrast, it can also be seen that the total response time during the most recent prior communication between the client device and network device 4 was relatively much higher at 1.98 seconds. Thus, a determination may be made that the estimated latency between the client device and network device 10 is much lower based upon the total response time of 0.22 seconds, than the estimated latency between the client device and network device 4 (total response time of 1.98 seconds). Similarly, it can also be determined that the estimated latency between the client device and network device (based upon the total response time of 0.67 seconds) is higher than the estimated latency between the client device and network device 6 (0.55 seconds), but lower than the estimated latency between the client device and network device (0.88 seconds).

Further in this regard, the total response time that is measured during one or more prior communications between the client device and a network device may not only reflect the latency caused by the network or link conditions between the client device and the respective network device (commonly known as the Round Trip Time or RTT), but may also include the latency caused by the time it takes for the network device to process the client device's request.

One or all network devices in matrix 36 may thus be ranked based upon the estimated latency, measured from the client's perspective, between the client device and respective network device during one or more prior communications between the client device and the network device. As described above, in one aspect network devices determined to have a lower estimated latency may be ranked with higher numbered ranks than other network devices that are determined to have a relatively higher estimated latency. In this regard, the numbered rank assigned to a network device may be any number, so long as it indicates the relative desirability (based upon the estimated latency as described above) of a network device relative to other network devices. Alternatively or in addition, the ranks that are assigned may be proportionally based upon the estimated latency, such that a first network device may be assigned a rank that is twice the rank assigned to a second network device based upon a determination that the estimated latency with respect to the first network device is half that of the second network device. In some embodiments, the rank may be determined in whole or in part by an order preserving function based on the estimated latency. For example, if a particular network device is more desirable based on a lower estimated latency than another network device, an order preserving function may be selected that ensures that the corresponding rank of that particular network device is also more desirable.

In another aspect of the present invention, the estimated latency between the client device and a network device in matrix 36 may be determined not only based upon latency metrics collected during a recent prior communication between the client device and a network device as described above, but rather based upon any prior communications between the client device and the network device. As shown in FIG. 5, for example, an application running on the client device such as the web-browser application 28 may not only collect latency metrics 402 associated with the most recent prior communications, but may also collect and average latency metrics 504 associated with the prior 25 communications between the client device and each of the network devices 300 in matrix 36. In another aspect, the web-browser application 28 may not only collect latency metrics 402 associated with any number of prior communications, but may also collect and average latency metrics regarding prior communications that occur during a period of time, such as, for example, prior communications that occurred in a previous hour, day, week, or any other prior period.

As before, the previous 25 communications between the client device and network devices 300 may be the previous requests for a desired resource that were transmitted by the client device to each of the network devices 300 over the network. Furthermore, the latency metrics 504 collected during the previous 25 requests to the network device 300 may indicate a measure of the average total response time, where the average total response time indicates the average amount of time that elapses between the time that each of the 25 requests was transmitted to a respective network device and the time that information responsive to the each request was received at the client device.

By way of a specific example, it can be seen FIG. 5 that the average total response time during the 25 prior communications between the client device and network device 10 was 0.18 seconds. In contrast, it can also be seen that the average total response time during the 25 prior communications between the client device and network device 4 was relatively much higher at 2.10 seconds. Thus, a determination may be made that the average estimated latency between the client device and network device 10 is much lower based upon the average total response time of 0.28 seconds, than the average estimated latency between the client device and network device (average total response time of 2.10 seconds). Similarly, it can also be seen that the average estimated latency during the 25 previous communications between the client device and network device 8 (based upon the average total response time of 0.54 seconds) is now lower than the average estimated latency between the client device and network device 6 (0.59 seconds), but higher than the average estimated latency between the client device and network device 7 (0.42 seconds).

As before, the average total response time that is measured during the 25 most recent prior communications between the client device and a network device may not only reflect the latency caused by the network or link conditions between the client device and the respective network device (as indicated by the RTT), but may also include the latency caused by the time it takes for the network device to process the client device's request.

The ranking of the network devices may be different depending upon whether a network device is ranked based upon the estimated latency determined from the most recent prior communication or a given number of prior communications. This can be seen in FIG. 5, for example, where network device 3 may be ranked higher than network device 1 based upon an estimated latency determined from latency metrics collected with respect to the most recent prior communication, but may instead be ranked lower than network device 1 based upon an estimated latency determined from an average of the latency metrics collected during the 25 previous communications.

Thus, in an additional aspect, one or more of the network devices may be ranked not solely based upon latency metrics collected during the most recent prior communication or during any given number of prior communications, but rather based upon a weighted combination of the latency metrics collected during any number of prior communications. In accordance with this aspect, a greater weight may be given to the latency metrics collected during any given number of more recent prior communications than any given number of older prior communications. By way of example only and without limitation, the estimated latency of network device 1 in FIG. 5 may thus be determined by a weighted combination of the response time during the most recent prior communication and the 25 most recent prior communications, where the most recent communication may be weighed by a factor of five (5). The estimated latency of network device 5 in FIG. 5 may thus be calculated as (0.46*5+0.51*1)/6=0.47 seconds.

Thus, one or all network devices in matrix 36 may be ranked, as described above, based upon a determination of an estimated latency, measured from the client's perspective, between the client device and respective network device during any given number of prior communications between the client device and the network device.

The information contained in the matrix may be used by client applications in several ways. For example, a client application such as the web-browser application 28 may perform a host name lookup in matrix 36 to determine the IP addresses of one or more network devices that are associated with a host name. In addition, the web-browser application 28 may also look up a rank assigned to one or more network devices in matrix 36, and select an optimal network device based upon its rank, where the rank is assigned to a network device is based upon an estimated latency between the client device and the network device.

Figure 15:
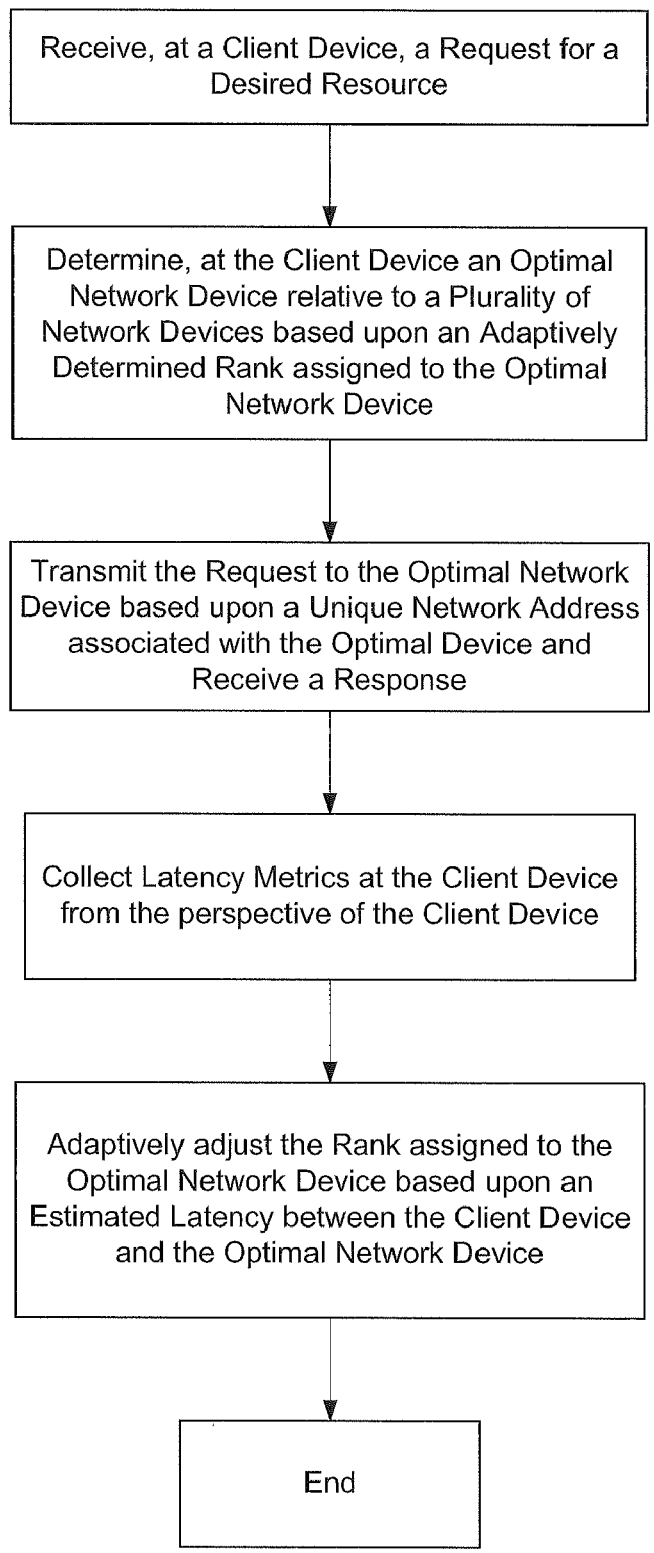
FIG. 15 illustrates a flow diagram of a process in accordance with one embodiment of the present invention.

An exemplary operation in accordance with the process shown in FIG. 15 and various aspects of the invention follows below. It should be understood that the following operations do not have to be performed in the precise order described below. Rather, various steps may be handled in reverse order or simultaneously.

Figure 6:
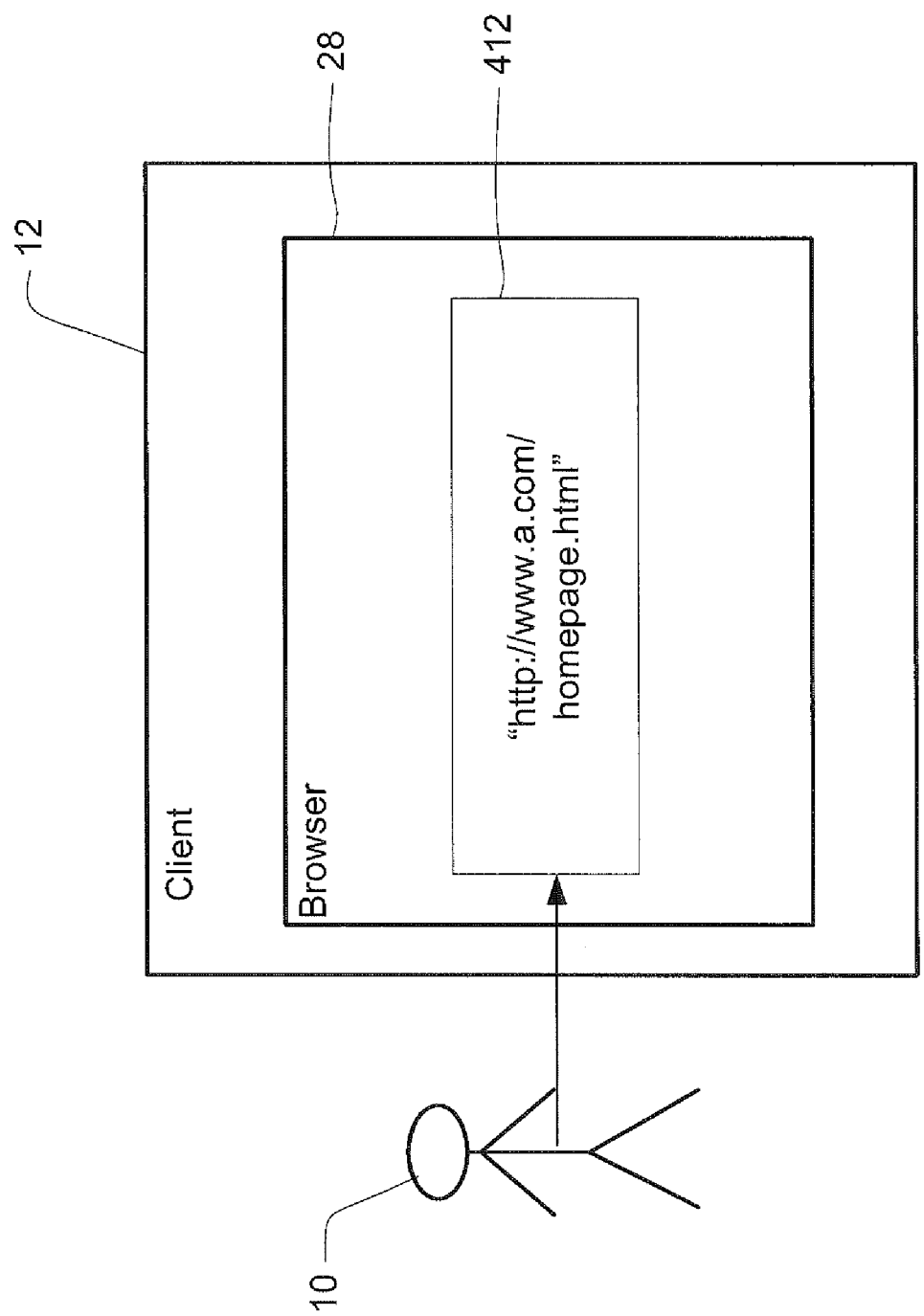

In accordance with one aspect of the system and method provided herein and as illustrated in FIG. 6, a user 10 at a client device 12 may request a desired resource (e.g., web-page) by entering a URL 412 into a web-browser application running on the client. The web-browser application may parse the URL 412 to identify the desired resource, its network location, and a protocol by which the desired resource may be obtained over the network. For example, the web-browser application 28 may parse URL 412 and determine that the resource desired by the user is the web-page "homepage.html", which may be obtained using the "HTTP" protocol from one or more network devices associated with the host name "www.a.com".

In order to service the user's request, the web-browser may first resolve the host name contained in the URL into one or more IP addresses, where each IP address may uniquely identify a network device that maintains the resource (e.g., "homepage.html") desired by the user. As illustrated by table 700 in FIG. 7 for example, web-browser application 28 may perform a host name lookup into matrix 36 to identify all network devices associated with the host name "www.a.com".

In addition to identifying the network devices associated with a common host name, the web-browser application may also determine an optimal network device based on its rank. As illustrated in FIG. 8, for example, the web-browser application 28 may select network device 6 as the optimal network device based upon a determination that network device 6 has the highest assigned rank of 68 (as indicated by the circled reference numeral 802) in comparison to the ranks assigned to all of the other network devices associated with the host name "www.a.com".

Upon selecting the optimal network device based on its rank, the web-browser application may then request the desired resource from the selected network device in accordance with one or more network protocols. By way of example, the web-browser application 28 may look up the IP address of the optimal network device 6 and request the desired resource "homepage.html" from network device 6 in accordance with the TCP/IP protocol suite.

In addition to determining the optimal network device and requesting the desired resource as described above, the web-browser application may also collect latency metrics regarding the request transmitted by the client device to the optimal network device, and adjust the rank assigned of the optimal network device based upon the collected latency metrics as described in detail above. By way of example, the web-browser application 28 may determine based upon the time it takes to receive the desired resource (i.e., "homepage.html") after it has been requested from network device 6, that the estimated latency between the client device and network device 6 has increased. Upon such determination, and as illustrated in FIG. 9, the client device may lower the rank of the network device 6 from 68 down to 41 (as shown by the circle 902), thus indicating that network device 6 is relatively less desirable for future communications due to the increased estimated latency between the client device and network device 6.

Figure 10:
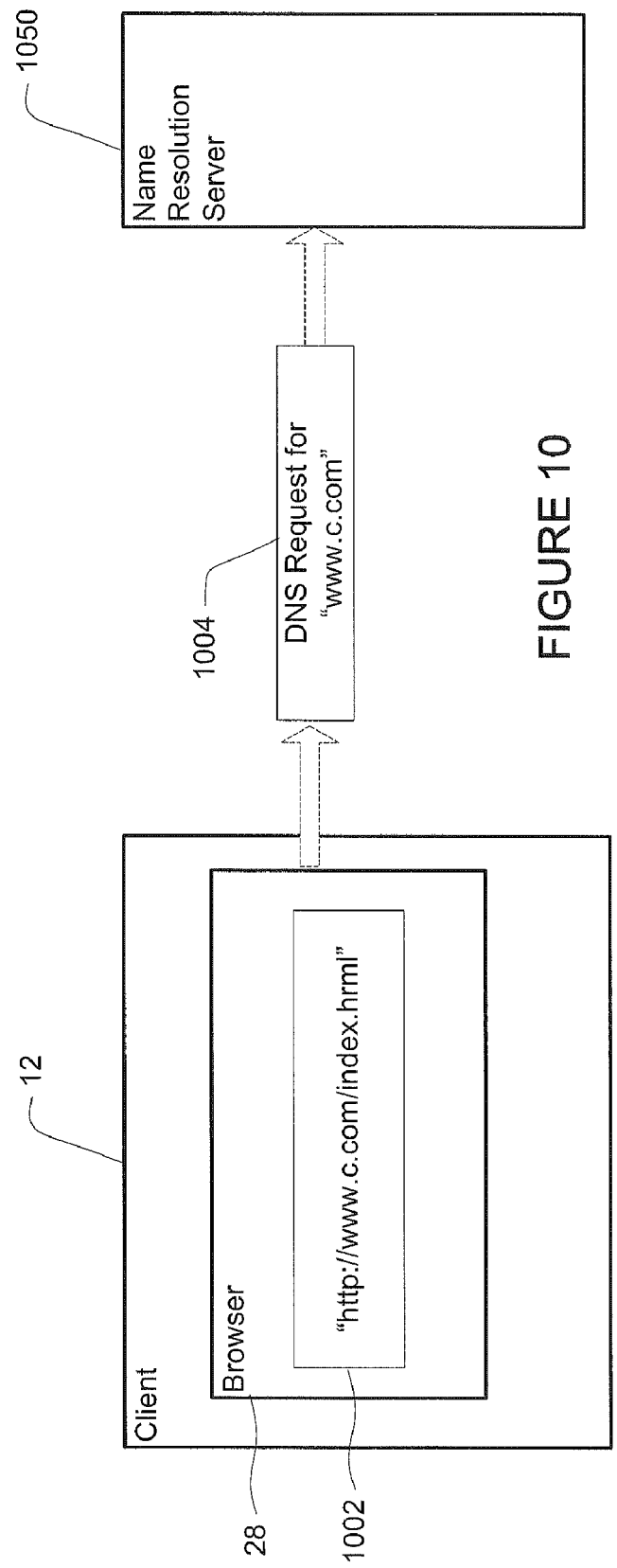

A yet another aspect of the system and method is now described below. In accordance with this aspect, the web-browser application, upon receiving and parsing a user's request for a desired resource as described above, may transmit a resolution request (e.g., a DNS request) to a network server (e.g., a DNS server) for resolving a common host name into the one or more IP addresses of the different network devices that are associated with the common host name. For example, and as illustrated in FIG. 10, the web-browser application 28 may parse the URL 1002 entered by the user and determine that the desired resource "index.html" may be obtained using the "http" protocol from one or more network devices associated with a common host name "www.c.com". Upon such determination, the web-browser 28 may transmit a DNS resolution request 1004 to a host name resolution server 1050 requesting resolution of the common host name "www.c.com" into the IP addresses of one or more network devices associated with the host name "www.c.com".

Figure 11:
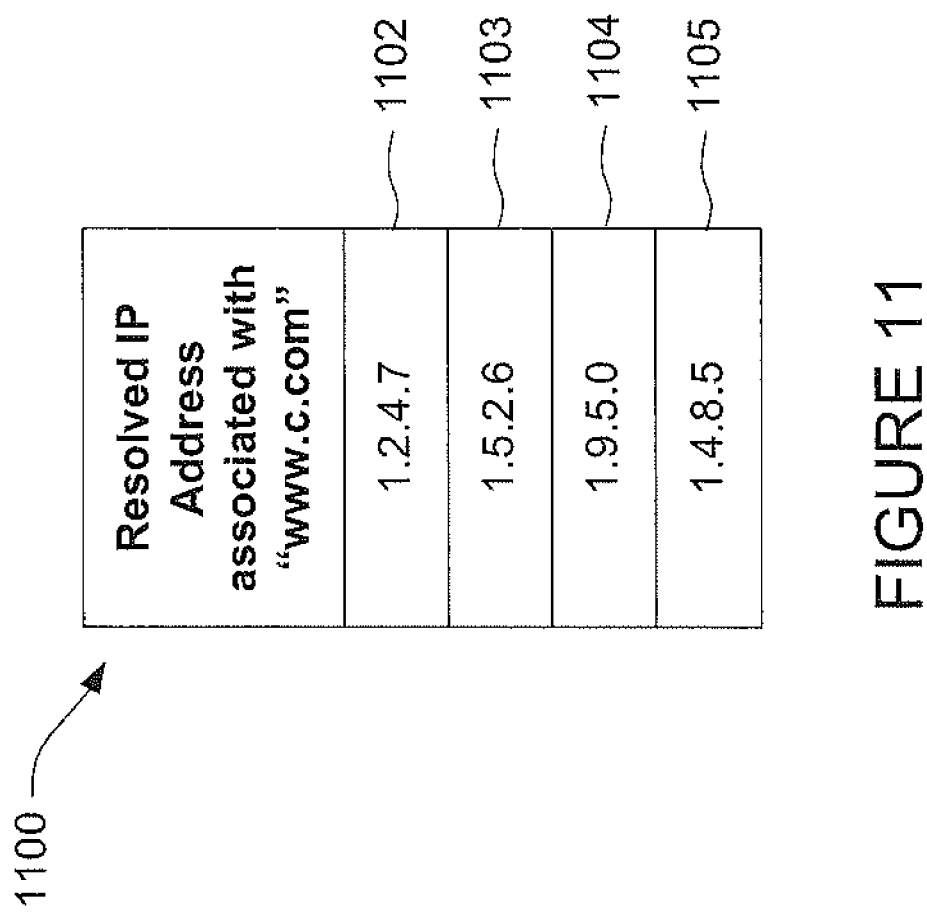

The host name resolution server, upon receiving the host name resolution request from the client device, may respond by resolving the host name "www.c.com" into a plurality of IP addresses and transmitting the resolved IP addresses back to the web-browser application on the client device, where each resolved IP address uniquely identifies a different network device associated with the host name "www.c.com". As seen in FIG. 11, for example, the resolved IP addresses received at the client 12 may include IP addresses 1102-1105, where each of the resolved IP address is different and identifies a network device associated with the common host name "www.c.com".

Upon receiving the resolved IP addresses associated with a common host name from the host name resolution server, the web-browser application may determine if any of the received IP addresses indicates that a new network device is available. For example, and as illustrated in FIG. 12, the web-browser application 28 may perform an IP address lookup in matrix 36 for each resolved IP address and determine that IP address "1.4.8.5" is a new IP address not found in matrix 36. Upon such determination, the web-browser application may add a new network device 14 to matrix 36 and assign the new IP address to that device.

In addition, the web-browser application may also assign other information to the new network device. In one aspect, the estimated geographical location of the new network device may be determined and included in the matrix. For example, the web-browser application 28 may maintain an IP geo-location database and may look up the estimated geographical location associated with the new IP address. Alternatively or in addition, the web-browser application 28 may use geo-location information obtained from an IP geo-location service provider to determine that the new IP address is located somewhere in "Boston" (as indicated by reference numeral 1214).

Yet further, the web-browser application may also assign a default rank to the new network device. In one aspect, the rank assigned to the new network device may be based upon the distance between the location of the client device and the estimated geographical location of the network device. In this regard, a network device that is determined to be located closer (e.g., within 0-100 miles) to the location of the client device may be assigned a higher rank than a network device that is determined to be located further (e.g., within 250-500 miles) from the location of the client device. For example, and as illustrated by the circle 1212, the web-browser application 28 may determine that the city of "Boston" is within 800-1000 miles from the location of the client device, and thus may assign a relatively lower default rank of 25 to network device 14.

In another aspect, the initial rank assigned to a new network device may be based on an average or median rank of all other network devices in matrix 36 that share the common host name of the new network device. For example, and as illustrated by table 1300 in FIG. 13, the web-browser application may identify, from matrix 36, that pre-existing network devices 4, 5, and 13 are associated with the same host name ("www.c.com"). The web-browser application 28 may thus assign a default rank of 16 (indicated by circle 1602) to the newly added network device 14, where the rank of 16 is determined by averaging the ranks assigned to each of the other network devices in table 1300 sharing the common host name (i.e., (13+21+15)/3=average rank of 16).

Instead of or in addition to the above, in a yet another aspect the initial rank assigned to a new network device may be determined based upon an estimated latency measured during a test communication between the client and the new network device. For example, the web-browser application 28 running on the client device 12 may transmit a ping request to the new network device 14, and the rank assigned to the new network device 14 may be based upon the time it takes to receive a response to the ping request from network device 14. Alternatively, the web-browser application may transmit a test content request to the new network device, such as a content request transmitted using the HTTP protocol. In one aspect, the test content request may be the actual request for the desired resource that may also have been transmitted to a ranked network device. In this case, the round trip time required to receive a response from the new network device may be used to assign a rank to the new device, while the round trip time required to retrieve the resource from the ranked network device may be used to update the rank of that device.

Still further, the initial rank assigned to the new network device may be based on a combination of any or all of the methods disclosed above, such as a weighted combination. Once a new rank has been assigned to the new network device, the web-browser application may then use and adjust the assigned rank as described above.

The aspects of the invention disclosed herein have the advantage of being flexible enough to accommodate a variety of alternatives.

For example, instead of transmitting a DNS request to a host name resolution or DNS server in order to resolve a host name into IP addresses as described above, in one aspect the client device may receive a listing of IP addresses associated with a common or similar host name from servers that do not support the DNS protocol. Thus, in some embodiments, other servers that are not primarily DNS Servers and do not support the existing DNS protocol, such as, for example, HTTP servers, may, as part of an HTTP response, include one or more alternative IP addresses that may be used by the applications such as the web-browser application on the client device, to transmit future traffic to a network device that is associated with a similar or identical host name. For example, a particular HTTP server having a common host name may include headers that supply alternate IP addresses that may act as DNS resolutions for the named HTTP server.

In other embodiments, other servers may provide trusted and/or cryptographically signed assertions that a second network device has a list of applicable IP address resolutions. Further still, other servers or network devices may provide resolved IP addresses and associated rankings, which may be used to assign, update, or replace ranks of one or more network devices in the matrix. In one aspect, the IP resolutions and the associated rankings may be obtained from servers that support DNS resolution protocols. In another aspect, the IP resolutions and the associated rankings may be obtained from different servers. In this case, associated rankings provided by un-trustworthy DNS servers may be discarded or ignored.

Yet further, the rank assigned to a network device may be determined not only based on an estimated latency determined from prior communications between the client and the network device, but may also be based upon the geographical distance between the location of the client device and the estimated geographical location of the network device. For example, where two network devices are ranked the same based upon their estimated latency, the client device may select a closer network device as the more desirable network device. In addition, the size of the communications may also be taken into account in determining the rank, where, for example, a network device that provides twice the data in a given amount of time is ranked twice as high as another network device that provides half the data in the same amount of time.

While a higher number rank has been used to indicate a network device's greater desirability relative to network devices having a lower numbered rank, this is not necessary, and network devices may also be ranked such that a network device having a lower numbered rank indicates its greater desirability over other network devices having a higher numbered rank. In this regard, the rank may be a bounded or unbounded whole number, real number, or even a negative number. Even further, the rank need not be a number at all, and may be any alphabetical or other symbolic rank as long as it can be used to indicate the relative desirability of a network device with respect to other network devices.

The estimated latency between a client device and one or more network devices may be determined by collecting latency metrics during any type of communication between the client device and the network device over the network. In this regard, the prior communications between the client device and a network device may include any type of request, such as a ping request, a connection request, a request for a web-page or other any other desired resource, a DNS request, a FTP request, or any other request transmitted over the network in accordance with one or more network protocols. While certain advantages are gained by ranking the network devices based upon an estimated latency determined from latency metrics collected during same or similar communications between the client device and each network device, this is not necessary, and the estimated latency may instead be determined based upon latency metrics collected during different types of communications between the client device and any or all of the network devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of transmitting information over a network, the method comprising:
   receiving, at a first network device in a network of devices, a request to obtain a desired resource over the network;
   determining, by a processor at the first network device, a plurality of network devices each having a common host name and a unique network address, where each network device in said plurality of network devices is adapted to provide the desired resource, and where at least one network device in said plurality of network devices is associated with a rank representing an estimated latency that is determined from one or more prior communications between the first network device and the at least one network device;
   selecting, at the first network device, an optimal network device from the plurality of network devices, where said optimal network device is selected based upon a rank associated with said optimal network device, and where said rank associated with said optimal network device indicates the greatest relative desirability of said optimal network device relative to other network devices in said plurality of network devices; and,
   transmitting one or more data packets requesting the desired resource from the first network device to the optimal network device over the network, where said one or more data packets are transmitted based upon the unique network address of the optimal network device.

2. The method of claim 1, wherein each remaining network device in said plurality of network devices is associated with a respective rank representing an estimated latency that is determined from one or more prior communications between the first network device and each remaining network device in said plurality of network devices.

3. The method of claim 1, wherein the rank associated with the at least one network device in said plurality of network devices is adjusted based on an estimated geographic location of said at least one network device.

4. The method of claim 1, wherein the rank associated with the at least one of said plurality of network devices is a default rank.

5. The method of claim 1, wherein the rank associated with the at least one network device in the plurality of network devices is based upon latency information collected during the one or more prior communications, over the network, between the first network device and the at least one network device.

6. The method of claim 1, wherein the estimated latency is based upon an RTT time, measured from the first network device's perspective, during the one or more prior communications between the first network device and the at least one network device in said plurality of network devices.

7. The method of claim 6, wherein the estimated latency is based upon a total response time, measured from the first network device's perspective, during the one or more prior communications between the first network device and the at least one network device in said plurality of network devices.

8. The method of claim 1, wherein determining the plurality of network devices further comprises receiving, at the first network device, a first response over the network from a server, where the first response is received in response to a first request transmitted by the first network device over the network, and where the first response includes a plurality of unique network addresses each associated with the common host name.

9. The method of claim 8, wherein the server is a domain name resolution server, the first request is a domain name resolution request, and the first response is a domain name resolution response.

10. The method of claim 8, wherein the server is an http server, the first request is an http request, and the first response is an http response.

11. A system for transmitting information over a network, the system comprising:
    a first network device including a memory storing instructions and data, the data comprising a first request for a desired resource to be provided over a network to a second device; and,
    a processor to execute the instructions and to process the data, wherein the instructions comprise:
       determining, by the processor at the first network device, a plurality of network devices having a common host name and a unique network address, where each network device in said plurality of network devices is adapted to provide the desired resource, and where at least one network device in said plurality of network devices is associated with a rank based upon an estimated latency that is determined from one or more prior communications between the first network device and the at least one network device;
    selecting, at the first network device, an optimal network device from the plurality of network devices, where said optimal network device is selected based upon a rank associated with said optimal network device, and where said rank associated with said optimal network device indicates the greatest relative desirability of said optimal network device relative to other network devices in said plurality of network devices; and,
    transmitting one or more data packets requesting the desired resource from the first network device to the optimal network device over the network, where said one or more data packets are transmitted based upon the unique network address of the optimal network device.

12. The system of claim 11, wherein each remaining network device in said plurality of network devices is associated with a respective rank representing an estimated latency that is determined from one or more prior communications between the first network device and each remaining network device in said plurality of network devices.

13. The system of claim 11, wherein the rank associated with the at least one network device in said plurality of network devices is adjusted based on an estimated geographic location of said at least one network device.

14. The system of claim 11, wherein the rank associated with the at least one of said plurality of network devices is a default rank.

15. The system of claim 11, wherein the rank associated with the at least one network device in the plurality of network devices is based upon latency information collected during the one or more prior communications, over the network, between the first network device and the at least one network device.

16. The system of claim 15, wherein the estimated latency is based upon an RTT time, measured from the first network device's perspective, during the one or prior more communications between the first network device and the at least one network device in said plurality of network devices.

17. The system of claim 15, wherein the estimated latency is based upon a total response time, measured from the first network device's perspective, during the one or more prior communications between the first network device and the at least one network device in said plurality of network devices.

18. The system of claim 11, wherein determining the plurality of network devices further comprises receiving, at the first network device, a first response over the network from a server, where the first response is received in response to a first request transmitted by the first network device over the network, and where the first response includes a plurality of unique network addresses each associated with the common host name.

19. The system of claim 11, wherein the server is a domain name resolution server, the first request is a domain name resolution request, and the first response is a domain name resolution response.

20. The system of claim 11, wherein the server is an http server, the first request is an http request, and the first response is an http response.

* * * * *